United States Patent [19]

Brytus

[11] Patent Number: 4,751,278

[45] Date of Patent: Jun. 14, 1988

[54] ADDUCTS OF MONOEPOXIDES AND SELECTED DIAMINES

[75] Inventor: Vincent Brytus, Mahopac, N.Y.

[73] Assignee: Ciba-Geigy Corporation, Ardsley, N.Y.

[21] Appl. No.: 43,893

[22] Filed: Apr. 29, 1987

[51] Int. Cl.[4] .............................................. C08G 59/64
[52] U.S. Cl. ........................................ 528/88; 528/93; 528/111; 528/407; 560/251; 564/346; 564/349; 564/452; 564/461
[58] Field of Search ................... 528/93, 88, 111, 407; 560/251; 564/346, 349, 452, 461

[56] References Cited

U.S. PATENT DOCUMENTS

| | | |
|---|---|---|
| 2,689,263 | 9/1954 | Schmidle et al. |
| 2,864,775 | 12/1958 | Newey . |
| 2,938,004 | 5/1960 | De Hoff et al. ............ 528/111 X |
| 3,538,184 | 11/1970 | Heer . |
| 3,888,898 | 6/1975 | Koppe et al. ............ 564/349 X |
| 4,330,660 | 5/1982 | Kluger et al. ............ 528/111 |
| 4,340,717 | 7/1982 | Kluger ............ 528/111 |
| 4,490,510 | 12/1984 | Cummings . |
| 4,574,145 | 3/1986 | Cummings . |

*Primary Examiner*—Earl Nielsen
*Attorney, Agent, or Firm*—Luther A. R. Hall

[57] ABSTRACT

The adducts of monoepoxides with selected diamines, preferably m-xylylenediamine, are useful as curing agents for the curing of epoxy resin compositions at very low temperatures (25°–50° F., −4° to 10° C.).

17 Claims, No Drawings

ADDUCTS OF MONOEPOXIDES AND SELECTED DIAMINES

The adducts of monoepoxides with selected diamines are useful as curing agents for curing epoxy resin compositions at very low temperature.

BACKGROUND OF THE INVENTION

Currently, the season for applying epoxy maintenance paints in the northern sections of the United States is restricted to the late spring, summer and early fall since such epoxy/polyamide paint systems do not cure satisfactorily at the low temperatures encountered in those areas during the rest of the year. Additionally, areas such as Alaska, the North Sea region and other more polar areas usually experience such climate conditions that make it virtually impossible for such epoxy/polyamide systems to be used satisfactorily for much of the year.

Accordingly, there is a compelling interest in finding a hardener system which can cure epoxy resin compositions satisfactorily at temperatures of 25°-50° F. (−4° to 10° C.) with curing times of within 24 hours.

The epoxy resin compositions containing such a hardener system must have a reasonable working life of some 6-8 hours as well as providing good cured properties particularly corrosion and chemical resistance. The gloss and color retention of the cured coatings must be at least equal to and preferably better than coatings prepared with a conventional epoxy/polyamide composition. The chemical resistance of the coatings prepared from the low temperature cure system must be at least equal to those obtained from the conventional epoxy/polyamide coatings.

Standard epoxy resin systems do not cure satisfactorily at low (40° F., 4° C.) and consequently limitations are imposed on the use of such systems in some applications. Relatively little mention is made in the prior art of curing epoxy resins at even moderately low temperatures.

U.S. Pat. Nos. 4,490,510 and 4,574,145 describe a new class of epoxy curing agents which are the reaction product of urea, formaldehyde and a polyamine. Epoxy resin compositions containing said products as hardeners can be cured at moderately low temperatures from 15° C. (59° F.) up.

U.S. Pat. No. 2,864,775 pertains to the adducts of aliphatic polyamines and aliphatic monoepoxides. These adducts are useful as hardeners for the curing of epoxy resin compositions at temperatures from 20° C. (68° F.) up. The speed of cure is slow at the low temperature and curing at temperatures of 40°-200° C. are recommended for best results.

Some commercially available materials designed to be reactive curing agents for the low temperature curing of epoxy resin compositions are available from the Cardolite Corporation of Newark, New Jersey. These materials are the reaction products of phenol, formaldehyde and an aliphatic amine. These are Mannich bases or the so-called phenalkamines. These hardeners are touted as curing agents for curing epoxy resin compositions at temperatures as low as 45° F. (7° C.).

U.S. Pat. No. 3,538,184 relates to adducts of polyepoxides with alkyl-substituted hexamethylenediamine. These adducts are useful as hardeners for epoxy resin compositions. Such epoxy resin compositions can be cured at temperatures as low as 5° C. (41° F.). Curing at that temperature requires some 28-32 hours to complete.

U.S. Pat. Nos. 2,689,263 and 2,864,775 describe the preparation of adducts of amines with monoepoxides to give the corresponding hydroxylalkylamine derivatives.

OBJECTS OF THE INVENTION

One object of the invention is to provide an adduct of a selected monoepoxide with a selected diamine.

Another object of this invention is to provide an epoxy resin composition containing said adduct as hardener which is curable at low temperatures (25°-50° F., −4° to 10° C.) in a reasonable time frame (24 hours) to give a cured final product with acceptable properties.

DETAILED DISCLOSURE

The instant invention pertains to the adducts prepared from selected monoepoxides and selected diamines where the amount of monoepoxide is 0.5 to 1.25 moles per each mole of diamine.

The monoepoxides useful in preparing the instant adducts are selected from the group consisting of alkyl glycidyl ethers where alkyl is of 3 to 14 carbon atoms, preferably 3 to 8 carbon atoms, and most preferably butyl, allyl glycidyl ether, phenyl glycidyl ether, the alkylphenyl glycidyl ethers where alkyl is of 1 to 18 carbon atoms, preferably 1 to 4 carbon atoms, most preferably tert-butyl, and the glycidyl esters of the tertiary monocarboxylic acids of 9 to 11 carbon atoms.

The diamines useful in preparing the instant adducts are selected from the group consisting of m-xylylenediamine, 1,2-diaminocyclohexane, isophoronediamine (=1,3,3-trimethyl 1-aminomethyl-5-aminocyclohexane), 1,3-bis(aminomethyl)cyclohexane, 4,4'-diaminodiphenylmethane and 4,4'diaminodicyclohexylmethane, preferably m-xylylenediamine.

The instant adducts are prepared by the general method of U.S. Pat. Nos. 2,689,263 and 2,864,775 by reacting the monoepoxide with the diamine by heating the two reactants together at a moderate temperature of 60°-80° C. for a period of 2 to 4 hours till adduct formation is complete.

The amount of monoepoxide used is 0.5 to 1.25 moles per each mole of diamine, preferably from 0.85 to 1 mole of monoepoxide per mole of diamine.

These ratios of reactants assure that the adduct represents a molecule where a sufficient number of the amino groups of the diamine are now reacted with the epoxy moiety of the monoepoxide to give substituted hydroxyalkylamino moieties. The presence of these hydroxy groups in the adducts provides a built-in accelerator for the subsequent curing reaction of an epoxy resin using said adducts as the hardener or curing agent.

These monoepoxides and diamines are largely items of commerce.

The instant invention also relates to an epoxy resin composition, curable at a temperature of 25°-50° F. (−4° to 10° C.), which comprises
  (a) an epoxy resin,
  (b) an effective amount of an adduct prepared from a monoepoxide selected from the group consisting of the alkyl glycidyl ethers where alkyl is of 3 to 14 carbon atoms, preferably 3 to 8 carbon atoms, most preferably butyl, allyl glycidyl ether, phenyl glycidyl ether, the alkylphenyl glycidyl ethers where alkyl is of 1 to 18 carbon atoms, preferably 1 to 4 carbon atoms, most preferably tert-butyl, and the glycidyl ester of the tertiary monocarboxylic acids of 9 to 11 carbon atoms, and from a diamine selected from the group consisting of m-xylylenediamine, 1,2-diaminocyclohexane, isophoronediamine (=1,3,3-trimethyl-1-aminomethyl-5-aminocyclohexane), 1, 3-bis(aminomethyl)cyclohexane, 4,4'-diaminodiphenylmethane and 4,4'-diaminodicyclohexylmethane, preferably m-xylylenediamine, where the amount of monoepoxide used is 0.5 to 1.25 moles per each mole of diamine, (c) an effective amount of an accelerator, and
(d) an effective amount of a compatibilizing agent.

The epoxy resins which can be cured at low temperature using the instant adducts are the resins which contain two or more epoxy groups per molecule.

However, the requirement that the instant compositions be curable at low temperature puts a high premium on the good compatibility of all components of the composition. Accordingly, the epoxy resins are preferably the liquid resins which are the diglycidyl ethers of bisphenol A [=2,2-(4-hydroxyphenyl)propane] or of bisphenol F [=di(hydroxylphenyl)methane]. The semi-solid or low molecular weight solid epoxy resins prepared by advancing said diglycidyl ethers with bisphenol A are also useful in the instant compositions.

Although the instant adducts possess a number of hydroxyl groups built-in the adduct molecule, it is still desirable to add as component (c) a further accelerator to assist in promoting the curing reaction at the low temperatures of this invention. Such accelerators are those which promote the reaction of amine functions with epoxy moieties. The accelerators useful in the epoxy compositions are selected from the group consisting of salicylic acid, phenol, phenol substituted by alkyl of 1 to 12 carbon atoms, preferably 4 to 9 carbon atoms, and the Mannich bases prepared from the reaction of phenol, formaldehyde and the dialkylamines.

The effective amount of component (c) is normally 0.5 to 5 parts by weight, preferably 1 to 3 parts by weight, per 100 parts of epoxy resin.

To assist in making the instant epoxy resin compositions more compatible and thus to promote the curing of said compositions at low temperature, the addition of compatibilizing agents is an important feature of the instant compositions.

The compatibilizing agents useful in the instant compositions are selected from the group consisting of benzyl alcohol, diethylene glycol, dipropylene glycol, the lower alkyl monoethers of ethylene glycol, preferably the monobutyl ether, and the lower alkyl monoethers of propylene glycol, preferably the monomethyl and the monoethyl ethers. Most preferably the compatibilizing agent is benzyl alcohol.

The effective amount of component (d) is normally 5 to 20 parts by weight, preferably 7 to 15 parts by weight, per 100 parts of epoxy resin in the composition.

An ancillary benefit of the instant invention results from the fact that the instant adducts serve to reduce the formation of carbamates which can occur by the reaction of a diamine with carbon dioxide in the atmosphere. The films prepared by curing the instant epoxy resin compositions have improved appearance with great clarity.

The adducts of this invention need not be isolated as individual compounds. The reaction mixture of diamine and monoepoxide where there is always an excess of amine functionality even at the highest ratio of 1.25 moles of monoepoxide per mole of diamine means that there is always as distribution of reactive species in the adduct as prepared. While the individual species can clearly be separated by distillation or other conventional techniques, there is clearly no need to do so. The adduct can serve most amply as prepared.

It is understood that the instant epoxy resin compositions may contain further conventional additives such as fillers, pigments, dyestuffs, flow agents, plasticizers and the like.

EXAMPLE 1

Adduct of m-Xylylenediamine and Butyl Glycidyl Ether

To a round-bottomed, four-necked flask equipped with a mechanical stirrer, nitrogen inlet tube, dropping funnel and thermometer/thermoregulator are added 42.2 parts by weight of m-xylylenediamine under a blanket of nitrogen. The diamine is warmed to 60° C. with stirring whereupon 50.0 parts by weight of butyl glycidyl ether are added dropwise to the reaction vessel over a period of one hour. The reaction mixture is then held at 60° C. for an additional hour to assure complete reaction to form the adduct.

For convenience and to form a formulated curing agent, the adduct prepared as described above is then diluted with 13.0 parts by weight of benzyl alcohol and with 3.5 parts by weight of salicylic acid.

The adduct prepared above is the adduct of 1.15 moles of butyl glycidyl ether per 1 mole of m-xylylenediamine.

EXAMPLE 2

Adduct of m-Xylylenediamine and p-tert-Butylphenyl Glycidyl Ether

Following the procedure given in Example 1, the above-identified adduct is prepared from 22.7 parts by weight of m-xylylenediamine and 32.2 parts by weight of p-tert-butylphenyl glycidyl ether.

The above adduct is formulated by the addition of 10 parts by weight of benzyl alcohol and of 1 part by weight of salicylic acid.

EXAMPLE 3

An epoxy resin composition is prepared by mixing 100 parts by weight of a commercial liquid epoxy resin which is a diglycidyl ether of bisphenol (ARALDITE GY6010, CIBA-GEIGY) and 65 parts by weight of the formulation prepared in Example 1. This corresponds to a composition having 100 parts by weight of component (a), 55 parts by weight of the adduct of Example 1 as component (b), 2.1 parts by weight of the accelerator salicylic acid of component (c), and 7.7 parts by weight of the compatibilizing agent benzyl alcohol of component (d).

This epoxy resin composition is coated using a conventional doctor knife procedure on a primed steel panel to give a film with a dry film thickness of 6 mils (0.1524 mm). The coated panel is held at 40° F. (4.4° C.) for a period of up to 7 days to allow the composition to cure.

The properties of the cured film are determined after 4 days and after 7 days with the results given below.

Differential scanning calorimetry (DSC) scans indicate that the extent of cure is 98% after 4 days and 98% after 7 days at 40° F. (4.4° C.).

| Property | After 4 Days | After 7 Days |
| --- | --- | --- |
| Direct Impact | 28 < 30 | 24 < 26 |
| Reverse Impact | 10 < 12 | 4 < 6 |
| Pencil Hardness | B | F |
| Persoz Hardness | 41 | 88 |
| Adhesion | 100% | 85% |
| Mandrel Bend (⅛", 3.2 mm) | Passes | Passes |

EXAMPLE 4

Another epoxy resin composition is prepared by mixing 100 parts by weight of a commercial liquid epoxy resin which is a diglycidyl ether of bisphenol A (ARALDITE GY6010) and 66 grams parts by weight of the formulation prepared in Example 2. This corresponds to a composition having 100 parts by weight of component (a), 55 parts by weight of the adduct of Example 2 as component (b), 1 part by weight of the accelerator salicylic acid as component (c), and 10 parts by weight of the compatibilizing agent benzyl alcohol as component (d).

A cured film is prepared from this composition as is described in Example 3 which has these properties after curing for a period of 7 days at 40° F. (4.4° C.).

| Property | After 7 Days |
| --- | --- |
| Pencil Hardness | HB |
| Persoz Hardness | 255 |
| MEK Rubs | 100 (double rubs) |

Differential scanning calorimetry (DSC) scans indicate the extent of cure is 80–85% after 7 days.

EXAMPLE 5

Curing of Epoxy Resin Compositions at 25° F. (−4° C.)

The effectiveness of the instant adducts in effecting the cure of an epoxy resin composition compared to the commercially available Mannich base phenalkamines is ascertained using a liquid epoxy resin which is the diglycidyl ether of bisphenol A. Curing is carried out at 25° F. (−4° C.) and at 40 ° F. (4.4° C.) for a period of 7 days. The extent of cure for each composition is determined using differential scanning calorimetry (DSC) on the cured films from each composition.

| Composition* Hardener | Amount of Hardener parts by weight | Percent of Cure After 7 Days Curing at | |
| --- | --- | --- | --- |
| | | 25° F.(−4° C.) | 40° F.(4.4° C.) |
| Instant Adduct** | 33.2 | 85 | 98 |
| NC-540*** | 40 | 54 | 75 |
| NC-541*** | 50 | 45 | 98 |

*Compositions each contain 100 parts by weight of the liquid epoxy resin which is a diglycidyl ether of bisphenol A (ARALDITE GY6010, CIBA-GEIGY)
**Adduct is prepared from 0.85 mole of butyl glycidyl ether and 1 mole of m-xylylenediamine. This composition also contains 0.8 parts by weight of salicylic acid and 8 parts by weight of benzyl alcohol
***NC-540 and NC-541 are Mannich base phenalkamines commercially available from Cardolite Corporation, Newark, New Jersey which are the reaction products of phenol, formaldehyde and aliphatic amines.

The instant adduct is far superior to the two commercial hardeners when curing is carried out at 25° F. (−4° C.) although the phenalkamine NC-541 gives essentially the same extent of cure when curing is carried out at 40° F. (4.4° C.).

What is claimed is:

1. An adduct which is the reaction product of a monoepoxide selected from the group consisting of the alkyl glycidyl ethers where alkyl is of 3 to 14 carbon atoms, allyl glycidyl ether, phenyl glycidyl ether, the alkylphenyl glycidyl ethers where alkyl is of 1 to 18 carbon atoms and the glycidyl esters of the tertiary monocarboxylic acids of 9 to 11 carbon atoms, and
   a diamine selected from the group consisting of m-xylylenediamine, 1,2-diaminocyclohexane, isophoronediamine, 1,3-bis(aminomethyl)cyclohexane, 4,4'-diaminodiphenylmethane and 4,4'-diaminodicyclohexylmethane,
   where the amount of monoepoxide used is 0.5 to 1.25 moles per each mole of diamine.

2. An adduct according to claim 1 where the monoepoxide is an alkyl glycidyl ether where alkyl is of 3 to 8 carbon atoms or is an alkylphenyl glycidyl ether where alkyl is of 1 to 4 carbon atoms.

3. An adduct according to claim 2 where the monoepoxide is butyl glycidyl ether or p-tert-butylphenyl glycidyl ether.

4. An adduct according to claim 1 where the diamine is m-xylylenediamine.

5. An adduct according to claim 1 wherein the monoepoxide is butyl glycidyl ether or p-tert-butylphenyl glycidyl ether and the diamine is m-xylylenediamine.

6. An adduct according to claim 1 wherein the amount of monoepoxide used is 0.85 to 1 mole per each mole of diamine.

7. An epoxy resin composition, curable at a temperature of 25°-50° F. (−4° to 10° C.), which comprises
   (a) an epoxy resin,
   (b) an effective amount of an adduct prepared which is the reaction product of
   a monoepoxide selected from the group consisting of the alkyl glycidyl ethers where alkyl is of 3 to 14 carbon atoms, allyl glycidyl ether, phenyl glycidyl ether, the alkylphenyl glycidyl ethers where alkyl is of 1 to 18 carbon atoms and the glycidyl esters of the tertiary monocarboxylic acids of 9 to 11 carbon atoms, and
   a diamine selected from the group consisting of m-xylylenediamine, 1,2-diaminocyclohexane, isophoronediamine, 1,3-bis(aminomethyl)cyclohexane, 4,4'-diaminodiphenylmethane and 4,4'-diaminodicyclohexylmethane, where the amount of monoepoxide used is 0.5 to 1.25 moles per each mole of diamine,
   (c) an effective amount of an accelerator, and
   (d) an effective amount of a compatibilizing agent.

8. A composition according to claim 7 where the epoxy resin of component (a) is a liquid diglycidyl ether of bisphenol A.

9. A composition according to claim 7 wherein the adduct of component (b) is prepared from a monoepoxide which is an alkyl glycidyl ether where alkyl is of 3 to 8 carbon atoms or is an alkylphenyl glycidyl ether where alkyl is of 1 to 4 carbon atoms.

10. A composition according to claim 9 wherein the monoepoxide is butyl glycidyl ether or p-tertbutylphenyl glycidyl ether.

11. A composition according to claim 7 wherein the adduct of component (b) is prepared from a diamine which is m-xylylenediamine.

12. A composition according to claim 7 wherein the adduct of component (b) is prepared from a monoepoxide which is butyl glycidyl ether or p-tertbutylphenyl glycidyl ether and the diamine is m-xylylenediamine.

13. A composition according to claim 7 wherein the adduct of component (b) is prepared from 0.85 to 1 mole of monoepoxide per each mole of diamine.

14. A composition according to claim 7 wherein the accelerator of component (c) is selected from the group consisting of salicyclic acid, phenol, phenol substituted by alkyl of 1 to 12 carbon atoms and the Mannich bases prepared from the reaction of phenol, formaldehyde and the dialkylamines.

15. A composition according to claim 14 wherein the accelerator is salicylic acid.

16. A composition according to claim 7 wherein the compatibilizing agent of component (d) is selected from the group consisting of benzyl alcohol, diethylene glycol, dipropylene glycol, the lower alkyl monoethers of ethylene glycol and the lower alkyl monoethers of propylene glycol.

17. A composition according to claim 16 wherein the compatibilizing agent is benzyl alcohol.

* * * * *